United States Patent
Huber et al.

(10) Patent No.: US 10,563,007 B2
(45) Date of Patent: Feb. 18, 2020

(54) IMPREGNATING RESIN, CONDUCTOR ARRANGEMENT, ELECTRICAL COIL AND ELECTRICAL MACHINE

(71) Applicant: Siemens Aktiengesellschaft, Munich (DE)

(72) Inventors: Juergen Huber, Erlangen (DE); Bernhard Klaussner, Nuremberg (DE); Dieter Schirm, Breitenguessbach (DE); Matthias Uebler, Ursensollen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 270 days.

(21) Appl. No.: 15/519,604

(22) PCT Filed: Oct. 19, 2015

(86) PCT No.: PCT/EP2015/074079
§ 371 (c)(1),
(2) Date: Apr. 17, 2017

(87) PCT Pub. No.: WO2016/062643
PCT Pub. Date: Apr. 28, 2016

(65) Prior Publication Data
US 2017/0240693 A1    Aug. 24, 2017

(30) Foreign Application Priority Data
Oct. 24, 2014  (DE) .......... 10 2014 221 715

(51) Int. Cl.
*C08G 59/68*  (2006.01)
*H01B 3/40*  (2006.01)
(Continued)

(52) U.S. Cl.
CPC .......... *C08G 59/686* (2013.01); *C08G 59/22* (2013.01); *C08J 5/24* (2013.01); *H01B 3/40* (2013.01);
(Continued)

(58) Field of Classification Search
CPC .................................. C08J 5/24; C08G 65/18
(Continued)

(56) References Cited

U.S. PATENT DOCUMENTS

| 4,113,791 A | 9/1978 | Smith et al. | 523/427 |
| 5,982,056 A | 11/1999 | Koyama et al. | 310/43 |

(Continued)

FOREIGN PATENT DOCUMENTS

| CN | 1287673 A | 3/2001 | B05D 7/00 |
| DE | 102004008365 A1 | 9/2005 | H01B 3/30 |

(Continued)

OTHER PUBLICATIONS

International Search Report and Written Opinion, Application No. PCT/EP2015/074079, 12 pages, dated Dec. 23, 2015.
(Continued)

*Primary Examiner* — Sanza L. McClendon
(74) *Attorney, Agent, or Firm* — Slayden Grubert Beard PLLC

(57) ABSTRACT

An impregnating resin, e.g., a catalytically hardenable impregnating resin for the conductor of an electrical machine, may include at least one reactive resin mixed with at least one reactive diluent and a hardening catalyst, e.g., for cationic, anionic or coordinate polymerization of the impregnating resin. The properties of the impregnating resin or use thereof may be improved by virtue of the reactive diluent containing a heterocyclic four-membered ring. The impregnating resin may be part of a main insulation of a
(Continued)

conductor arrangement, which may in turn be installed in an electrical coil or other electrical machine.

11 Claims, 1 Drawing Sheet

(51) Int. Cl.
  *H02K 3/30* (2006.01)
  *C08G 59/22* (2006.01)
  *C08J 5/24* (2006.01)
(52) U.S. Cl.
  CPC ............ *H02K 3/30* (2013.01); *C08J 2363/00* (2013.01); *C08K 2201/005* (2013.01); *C08K 2201/011* (2013.01)
(58) Field of Classification Search
  USPC .................................. 522/168; 523/400, 427
  See application file for complete search history.

(56) References Cited

U.S. PATENT DOCUMENTS

| | | | |
|---|---|---|---|
| 6,524,710 B1 | 2/2003 | Gsellmann | 428/414 |
| 6,924,008 B2* | 8/2005 | Takai | C08G 59/68 428/1.1 |
| 2003/0032729 A1 | 2/2003 | Takai et al. | 525/107 |
| 2003/0191256 A1 | 10/2003 | Hayashi | 526/204 |
| 2007/0243318 A1 | 10/2007 | Meichsner et al. | 427/120 |
| 2008/0039608 A1* | 2/2008 | Mills | C07D 407/14 528/37 |
| 2008/0121845 A1* | 5/2008 | Mills | C08G 65/18 252/500 |
| 2009/0230360 A1 | 9/2009 | Komuro et al. | 252/500 |
| 2010/0119835 A1 | 5/2010 | Messe et al. | 428/414 |
| 2010/0143639 A1 | 6/2010 | Le et al. | 428/76 |
| 2010/0297453 A1 | 11/2010 | Maenaka et al. | 428/418 |
| 2011/0159296 A1* | 6/2011 | Maenaka | B32B 15/08 428/416 |
| 2018/0237668 A1* | 8/2018 | Mizori | C08L 79/04 |

FOREIGN PATENT DOCUMENTS

| | | | | |
|---|---|---|---|---|
| DE | 60036933 T2 | 8/2008 | ............ | C08G 59/68 |
| DE | 102009039456 A1 | 3/2011 | ............... | H01B 3/04 |
| JP | 08283320 A | 10/1996 | ............... | C08F 4/00 |
| RU | 2414015 C1 | 3/2011 | ............... | H01B 3/40 |
| WO | 2016/062643 A1 | 4/2016 | ............ | C08G 59/68 |

OTHER PUBLICATIONS

German Office Action, Application No. 102014221715.6, 8 pages, dated Mar. 18, 2015.
Russian Office Action, Application No. 2017113818, 5 pages, dated Feb. 12, 2018.
Chinese Office Action, Application No. 201580062729.4, 8 pages, dated Aug. 20, 2018.

* cited by examiner

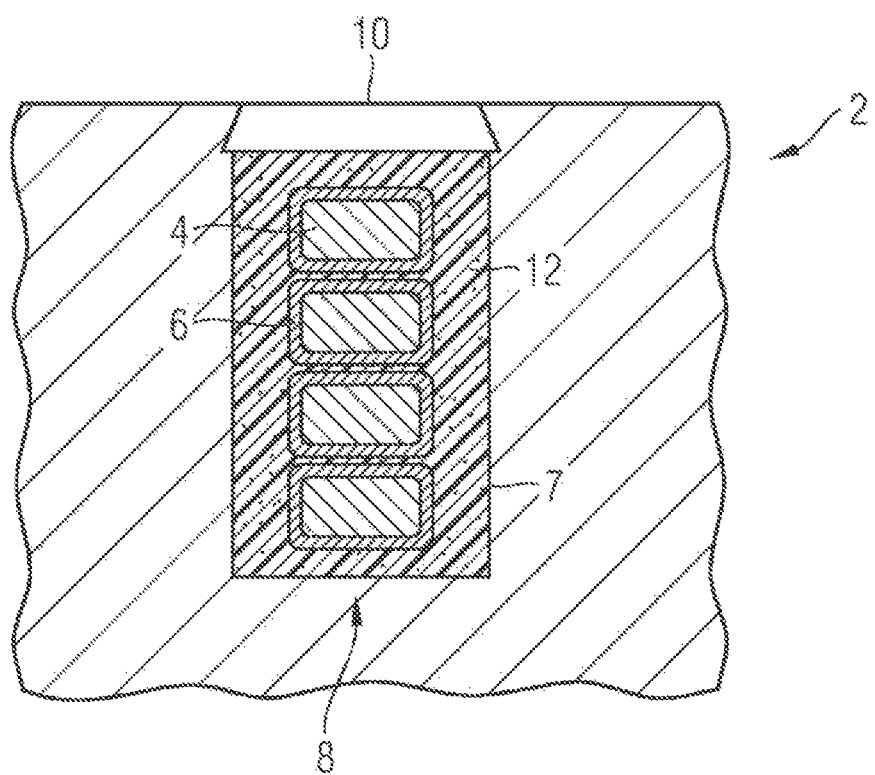

IMPREGNATING RESIN, CONDUCTOR ARRANGEMENT, ELECTRICAL COIL AND ELECTRICAL MACHINE

CROSS-REFERENCE TO RELATED APPLICATIONS

This application is a U.S. National Stage Application of International Application No. PCT/EP2015/074079 filed Oct. 19, 2015, which designates the United States of America, and claims priority to DE Application No. 10 2014 221 715.6 filed Oct. 24, 2014, the contents of which are hereby incorporated by reference in their entirety.

TECHNICAL FIELD

The invention relates to an impregnating resin, more particularly a catalytically curable impregnating resin for the insulation structure of an electrical machine, comprising at least one reactive resin mixed with at least one reactive diluent and a curing catalyst, particularly for cationic, anionic or coordinative polymerization of the impregnating resin. The invention further relates to a conductor arrangement and also to an electrical coil and an electrical machine having such a conductor arrangement.

BACKGROUND

Electrical machines, especially rotating electrical machines, contain an electrical winding within a laminated core. The winding consists of electrical conductors (possibly already provided with primary insulation) and solid insulating materials as main insulation. Without further measures, there is no intimate connection between the laminated core, the conductors, and the main insulation, meaning that gaps and voids are formed. On operation under atmospheric conditions, these regions would be filled with air. Particularly with applications in the high-voltage range, this is unallowable, since partial electrical discharges would destroy the insulation within a very short time. This leads to the failure of the electrical machine.

In order to produce an intimate connection and hence to displace air, the winding is impregnated using a curable impregnating resin or impregnating varnish. The solid insulating materials here may be porous in design, to increase the uptake of impregnating resin. Examples of such systems are mica tapes, insulating papers or nonwoven fabrics. For the impregnation of high-voltage machines, mixtures of epoxy resins and liquid, cycloaliphatic acid anhydrides are state of the art—see, for example, U.S. Pat. No. 4,113,791 (A). The acid anhydrides here serve as curing agents for polyaddition with an epoxy resin and at the same time lower the viscosity, to the benefit of rapid and complete impregnation.

Acid anhydrides, however, are generally compounds with a sensitizing effect, especially if taken up via the respiratory tract. For this reason, corresponding safety measures are mandatory when operating with acid anhydrides.

SUMMARY

One embodiment provides an impregnating resin, e.g., a catalytically curable impregnating resin, for conductors of an electrical machine, the impregnating resin comprising at least one reactive resin mixed with at least one reactive diluent, and a curing catalyst comprising an imidazole compound for anionic polymerization of the impregnating resin, wherein the reactive diluent comprises a heterocyclic four-membered ring.

In one embodiment, the heterocyclic four-membered ring is an oxetane.

In one embodiment, the oxetane is a 3-ethyl-3-hydroxymethyloxetane, 3-ethyl-3-[(2-ethylhexyloxy)methyl]oxetane; and/or 3-ethyl-3-{[(3-ethyloxetan-3-yl)methoxy]methyl}oxetanes.

In one embodiment, the fraction of the heterocyclic four-membered ring is between 0.01 wt % and 50 wt %, more particularly between 0.01 wt % and 10 wt %.

In one embodiment, the impregnating resin comprises tertiary amines and/or imidazole compounds as ionic curing catalysts.

In one embodiment, the impregnating resin comprises at least one organic and/or inorganic nanoscale filler.

In one embodiment, the impregnating resin comprises at least one organic and/or inorganic microscale filler.

Another embodiment provides a conductor arrangement composed of a number of conductors, the number of conductors being surrounded by a main insulation impregnated by means of an impregnating resin as disclosed above.

In one embodiment, the main insulation has a porous material and the curing catalyst for the impregnating resin is included in the porous material.

Another embodiment provides an electrical coil comprising a conductor arrangement as disclosed above.

Another embodiment provides an electrical machine, e.g., a rotating electrical machine, having a conductor arrangement as disclosed above.

BRIEF DESCRIPTION OF THE FIGURE

The sole FIGURE, FIG. 1, shows an example conductor arrangement comprising a plurality of conductors, each having a primary insulation, according to one example embodiment.

DETAILED DESCRIPTION

Embodiments of the invention provide an impregnating resin having improved properties for a conductor arrangement of an electrical machine.

Some embodiments provide an impregnating resin, e.g., a catalytically curable impregnating resin for the conductors of an electrical machine, comprising at least one reactive resin mixed with at least one reactive diluent and a curing catalyst, which comprises at least one imidazole or an imidazole compound, wherein the reactive resin has at least one oxirane functionality.

Some embodiments provide a conductor arrangement composed of a number of conductors, the number of conductors being surrounded by a main insulation which is impregnated by means of an impregnating resin of this kind. The main insulation in this case is composed in particular of solid, porous insulating materials such as, for example, mica tapes, insulating papers or nonwoven fabrics.

Other embodiments provide an electrical coil having a conductor arrangement of this kind.

Still other embodiments provide an electrical machine having a conductor arrangement of this kind. The advantages and preferred embodiments given below in relation to the impregnating resin can be transposed mutatis mutandis to the conductor arrangement, the electrical coil, and the electrical machine.

A curing catalyst is understood here as a compound which permits cationic, anionic or coordinative polymerization of the impregnating resin. Various curing catalysts can be used, with the fraction of volatile acid anhydrides kept as low as possible for the reasons stated at the outset.

As cationic curing catalysts it is possible in particular for organic salts, for example, to be employed. These organic salts may comprise, for example, compounds such as organic ammonium salts, sulfonium salts, phosphonium salts, or imidazolium salts. Thus, for example, 2-butylenetetramethylene sulfonium hexafluoroantimonate is one possible cationic curing catalyst.

Metal complex compounds, i.e., compounds having one or more central metal atoms which have ligands, organic ligands for example, bonded coordinatively, may also be employed additionally as curing catalyst—as coordinative, as cationic or as anionic curing catalysts. The metal complex compounds may be charged or uncharged and may contain corresponding counterions.

Anionic curing catalysts used also include, for example, tertiary amines as well as the imidazole compounds. Examples here would include 4,5-dihydroxymethyl-2-phenylimidazole and/or 2-phenyl-4-methyl-5-hydroxymethylimidazole.

Relative to the known acid anhydride curing catalysts, the curing catalysts stated here may have the advantage that they exhibit lower moisture sensitivity and/or reduced toxicological objectionability.

According to one embodiment, a curing catalyst will be present in an amount in the range from 0.001 to 10 wt % in the impregnating resin at impregnation.

The curing catalyst in this case may be present both in the storable impregnating resin and in the solid, porous insulating material to be impregnated, such as, for example, in mica tapes, insulating papers or nonwoven fabrics in storage.

An embodiment wherein the curing catalyst is contained in the porous insulating material and the impregnating resin is stored without curing catalyst is particularly preferred, since the absence of the curing catalyst from the impregnating resin allows the storage stability of said resin to be boosted massively. Moreover, no particular interactions of the curing catalyst with the porous insulating material have been found.

Known, commercial reactive diluents can be used as reactive diluent. For example, a reactive diluent having a heterocyclic four-membered ring may also be used, with an oxygen as heteroatom, for example—that is, an oxetane. Examples would include 3-ethyl-3-hydroxymethyloxetane, 3-ethyl-3-[(2-ethyl-hexyloxy)methyl]oxetane; and/or 3-ethyl-3-{[(3-ethyloxetan-3-yl)methoxy]methyl}oxetanes.

The reactive diluent may be present in an amount of, for example, 0.01 to 50 wt %, more particularly from 0.01 to 10 wt %, in the impregnating resin.

Through the amount of reactive diluent it is possible, for example, to adjust the rheological behavior of the impregnating resin, since the oxetanes generate low viscosities in the impregnating resin. The oxetanes identified here also have the effect, for example, of good vacuum resistance on the part of the impregnating resin, even at relatively high temperatures, since the oxetanes have a low vapor pressure.

Advantageously, moreover, the impregnating resin comprises at least one organic and/or inorganic nanoscale filler. The nanoparticles, which may also be in the form of a mixture of different nanoscale fillers, improve in particular the impact toughness, the delamination behavior, the susceptibility to cracking, and the partial-discharge resistance of the cured impregnating resin.

Employed for example as reactive diluent is 3-ethyl-3-{[(3-ethyloxetan-3-yl)methoxy]methyl}oxetane in a glycidyl ether resin, more particularly in distilled bisphenol F diglycidyl ether (BFDGE). Advantageously here an amount of up to 5% of the reactive diluent in distilled BFDGE is used.

In tests it has been possible here to achieve a glass transition temperature of 149° C. for a sample cured at 145° C. for 10 hours and consisting of 96 wt % of distilled BFDGE, 2 wt % of 1,2-dimethylimidazole, and 2 wt % of OXT-221.

Also an advantage is that the impregnating resin comprises at least one organic and/or inorganic microscale filler, in other words a filler having an average particle size in the micrometer range, or a microscale filler mixture. Also conceivable is a mixture of microscale fillers. The effect of such fillers is to raise the mechanical strength.

According to one preferred embodiment, the final curing temperature of the impregnating resin is in the range from 120 to 190° C., preferably in the range from 130° C. to 170° C. For this purpose, corresponding curing catalysts are reacted with a suitable reactive resin. An impregnating resin of this kind is intended for use in electrical machines, more particularly for rotating electrical machines and high-voltage applications. The reactive resin here may be any desired reactive resin having oxirane functionalities, or a mixture of different reactive resins having oxirane functionalities.

FIG. 1 shows an example conductor arrangement 2 comprising a plurality of conductors 4, each having a primary insulation 6 (e.g., of mica tapes, wire enamel, polyimide foil), according to one example embodiment. The conductor arrangement 2 is arranged in a groove 7 of a laminated core 8, the opening of which is sealed by a groove closure 10.

The groove 7, moreover, is filled with a main insulation 12. The main insulation 12 is impregnated with an impregnating resin which comprises at least one reactive resin mixed with at least one reactive diluent and a curing catalyst, the reactive diluent comprising a heterocyclic four-membered ring. In this case the impregnating resin displaces the air in the groove 7. The main insulation 12 has a porous material, in particular an insulating material, and the curing catalyst for the impregnating resin is contained in the porous material.

The conductor arrangement 2 is part of an electrical coil, which is not shown in detail here. The electrical coil is in turn installed in an electrical machine. Alternatively the conductor arrangement 2 is installed in the electrical machine without being part of an electrical coil.

The invention relates to an impregnating resin, more particularly a catalytically curable impregnating resin for the conductors of an electrical machine, comprising at least one reactive resin mixed with at least one reactive diluent and a curing catalyst, particularly for anionic polymerization of the impregnating resin, wherein the properties of the impregnating resin in the context of its use are improved by the presence in the reactive diluent of a heterocyclic four-membered ring. The impregnating resin is part of a main insulation (12) of the conductor arrangement (2), which is in turn installed in an electrical coil or, generally, in an electrical machine.

The invention claimed is:

1. An insulation for a conductor arrangement, the insulation comprising:
   a main insulation for application to a plurality of conductors, wherein the main insulation is impregnated by an impregnating resin comprising:
   at least one reactive resin mixed with at least one reactive diluent, and a curing catalyst comprising an imidazole compound for anionic polymerization of the impregnating resin,
wherein the reactive diluent comprises a heterocyclic four-membered ring.

2. The impregnating resin of claim 1, wherein the heterocyclic four-membered ring is an oxetane.

3. The impregnating resin of claim 2, wherein the oxetane comprises at least one of (a) 3-ethyl-3-hydroxymethyloxetane, 3-ethyl-3-[(2-ethylhexyloxy)methyl]oxetane; or (b) 3-ethyl-3-{[(3-ethyloxetan-3-yl)methoxy]methyl}oxetanes.

4. The impregnating resin of claim 1, wherein the heterocyclic four-membered ring is between 0.01 wt % and 50 wt % of the impregnating resin.

5. The impregnating resin of claim 1, further comprising tertiary amines and/or additional imidazole compounds serving as ionic curing catalysts.

6. The impregnating resin of claim 1, comprising at least one organic and/or inorganic nanoscale filler.

7. The impregnating resin of claim 1, comprising at least one organic and/or inorganic microscale filler.

8. A conductor arrangement comprising:
a plurality of conductors, and
a main insulation surrounding the plurality of conductors,
wherein the main insulation is impregnated by an impregnating resin comprising:
at least one reactive resin mixed with at least one reactive diluent, and
a curing catalyst comprising an imidazole compound for anionic polymerization of the impregnating resin,
wherein the reactive diluent comprises a heterocyclic four-membered ring.

9. An electrical coil comprising a conductor arrangement comprising:
a plurality of conductors, and
a main insulation surrounding the plurality of conductors,
wherein the main insulation is impregnated by an impregnating resin comprising:
at least one reactive resin mixed with at least one reactive diluent, and
a curing catalyst comprising an imidazole compound for anionic polymerization of the impregnating resin,
wherein the reactive diluent comprises a heterocyclic four-membered ring.

10. The conductor arrangement of claim 9, wherein the main insulation has a porous material, and the curing catalyst for the impregnating resin is included in the porous material.

11. A rotating electrical machine, comprising:
a conductor arrangement comprising:
a plurality of conductors, and
a main insulation surrounding the plurality of conductors,
wherein the main insulation is impregnated by an impregnating resin comprising:
at least one reactive resin mixed with at least one reactive diluent, and
a curing catalyst comprising an imidazole compound for anionic polymerization of the impregnating resin,
wherein the reactive diluent comprises a heterocyclic four-membered ring.

* * * * *